July 30, 1935.  S. BRAMLEY-MOORE  2,009,632
JACKING APPARATUS FOR VEHICLES
Filed Aug. 8, 1933  4 Sheets-Sheet 3

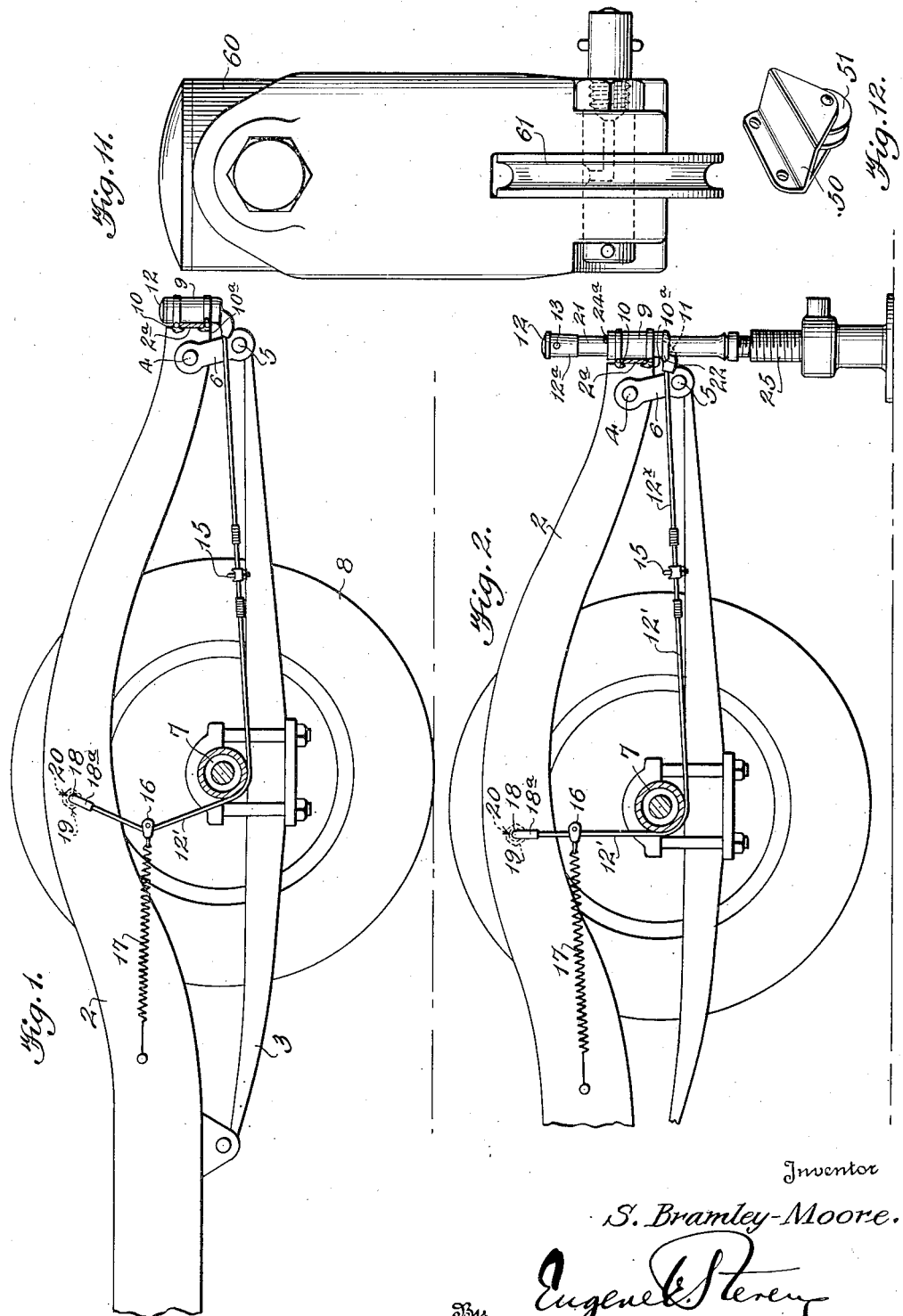

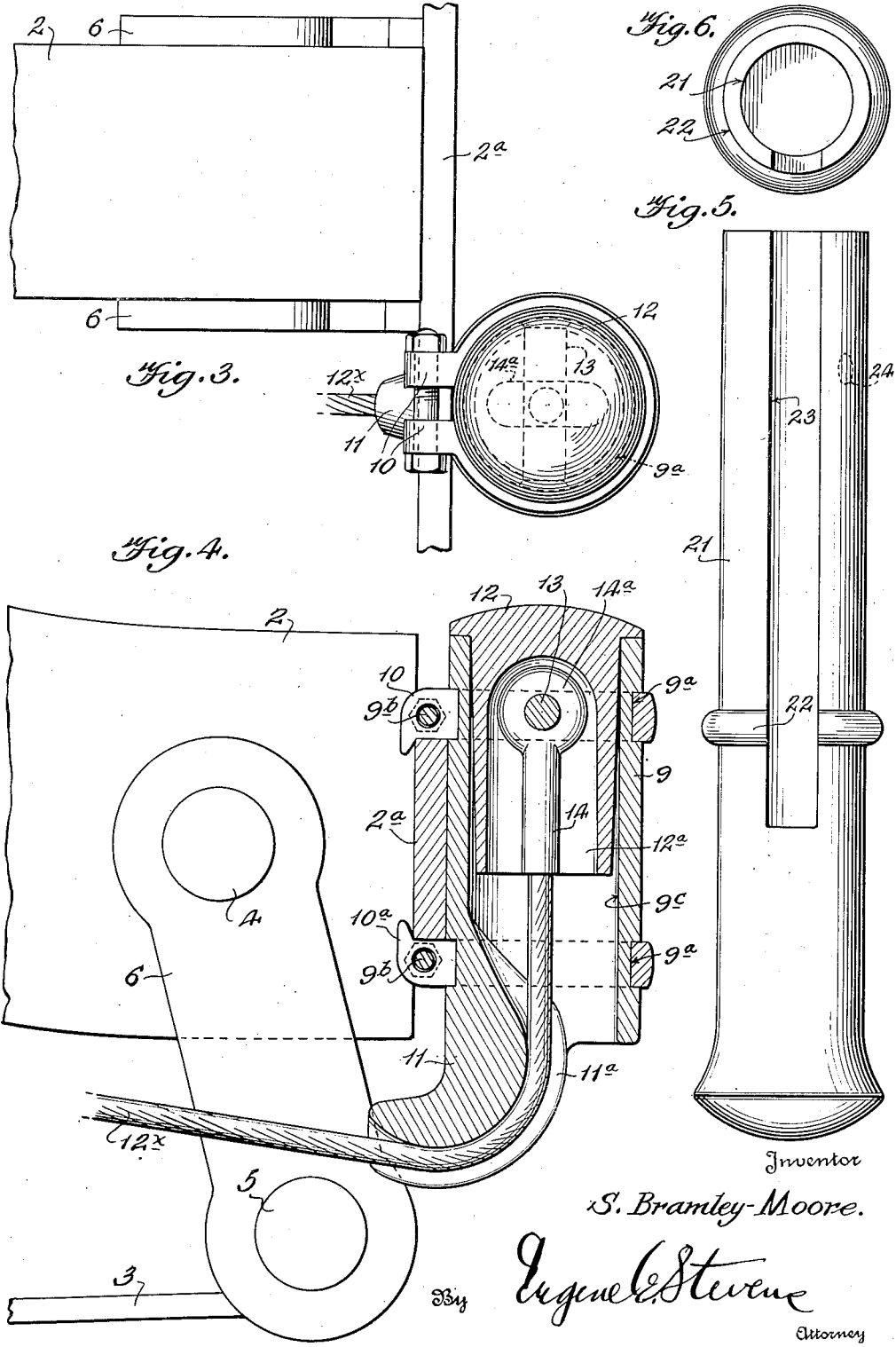

Inventor
S. Bramley-Moore.
By Eugene Stevens
His Attorney

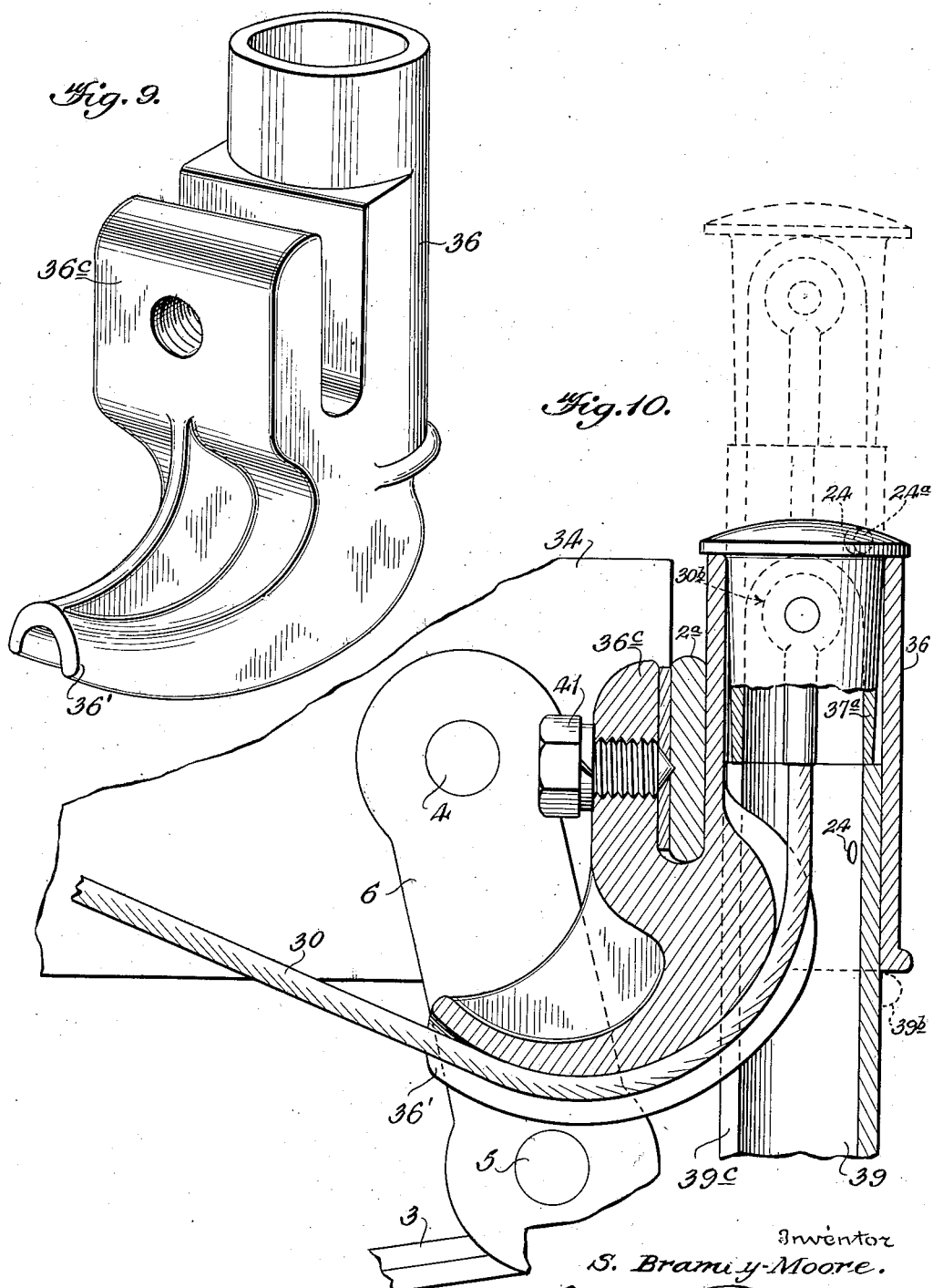

Patented July 30, 1935

2,009,632

UNITED STATES PATENT OFFICE 2,009,632

JACKING APPARATUS FOR VEHICLES

Swinfen Bramley-Moore, White Plains, N. Y., assignor to General Motors Corporation, Detroit, Mich., a corporation of Delaware Application April 8, 1933, Serial No. 665,180

13 Claims. (Cl. 280—150)

My invention relates to improvements in automobile jacking means whereby a wheel may be efficiently jacked up without the necessity of placing the jack under the axle.

It is a well-known fact that it is difficult to properly place a jack under the axle preparatory to changing tires. In the case of many present day car models whose bodies are especially low slung, the difficulty is greater than ever before. If the head of the jack is engaged with the rear end of the channel side member of the chassis there is considerable lost motion in jacking up the car owing to the fact that the spring, as the weight on same is relieved, will sag or arch downwardly. The net result of this is that not only will the elevation of the wheel from the ground be greatly delayed, but the average standard type jacks will not have sufficient extension to accommodate the greater lift now required. Some efforts have been made to provide for the simultaneous elevation of the chassis side and axle, but hitherto these devices have been of a somewhat complicated and costly character.

It is therefore the primary object of my invention to employ an absolutely standard present day type of jack in conjunction with a novel and improved vehicle-carried device which will efficiently cause the chassis, axle and wheel to move upwardly as a unit without changing the load on the spring and thereby avoiding lost motion.

Furthermore, the present invention contemplates a device or apparatus for this purpose which will be very simple in construction, easy to install, one which will be substantially foolproof in operation with no links or levers to freeze up in cold weather, and will remain serviceable and in order for long periods of time without requiring any attention at all,—the nature of the apparatus being such that it will not be noticeable when not in use and will thus not detract from the appearance of the car.

Furthermore, the invention contemplates an apparatus of this kind which can be applied to the various makes of cars without modification of standard construction.

Other objects and advantages of the invention will become apparent as the description proceeds, the accompanying drawings illustrating a mechanical expression of the invention. However, it will be obvious that various changes and modifications may be made in same within the spirit and scope of the subject matter claimed hereinafter.

Another object is the provision of snubber means having an element that is adopted for engagement by jacking means for elevating the wheel axles and chassis as a unit.

In the drawings,

Figure 1 is a view partly in section and partly in side elevation illustrating the application of the invention to one side of the rear chassis portion of an automobile;

Figure 2 is a similar view, but illustrating the application of a jack and the elevation of the adjacent rear wheel;

Figure 3 is a top plan view illustrating the application of the bracket portion to the bumper;

Figure 4 is a vertical sectional view through the bracket and bumper;

Figures 5 and 6 are, respectively, side and end elevational views of a removable sleeve element incorporated in the invention;

Figure 9 is a perspective view of the modified form of bracket shown in Figures 7 and 8;

Figure 10 is a vertical sectional view showing the bracket of Figure 9 installed;

Figure 11 is an elevational view of a still further form of bracket having a pulley; and Figure 12 is a perspective view of a pulley including guide that may be used in lieu of 35 in Figures 7 and 8.

Figure 7:
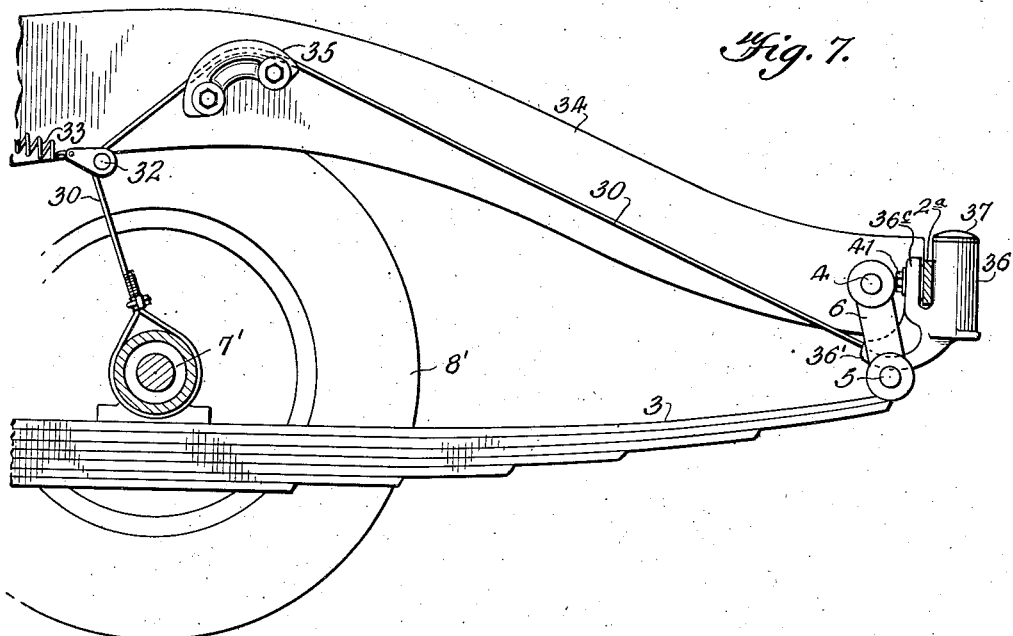
Figures 7 and 8 are side elevational illustrations, partly in section, of a modified form of the invention, in different positions.

Referring specifically to the drawings by reference characters which designate the same parts in all views, numeral 2 denotes one of the channel side frame members of the chassis, while 3 indicates one of the usual elliptic springs whose rear end is pivoted as at 5 to a swinging shackle link 6 which is pivoted, as at 4, to the chassis member 2. This, of course, is standard construction.

The purpose of the swinging shackle link 6 is, of course, to permit flexation of the spring 3 in the performance of its functions under varying loads. For instance, when the load on the spring is increased, the spring tends to flatten out,— which is to say, the eye ends are thrown further apart. This is made possible by the outward or rearward swinging of the link 6. Conversely, when the load on the spring is decreased, the shackle link 6 swings inwardly and the spring arch or curvature will increase.

When jacking up the car by engaging the jack head with the rear extension of the channel side member 2, it will be perfectly plain that a considerable amount of excess manipulation of the jack will be necessary because the axle and wheel will not be lifted upwardly until the spring has been completely unloaded, and even then the axle and wheel will not move upwardly until the lifting movement of the jack has overcome the weight of the axle and the wheel. Much of the labor or energy exercised in jacking up a wheel under these circumstances is lost, and moreover, this cannot be done with a standard jack except as to low slung cars without putting a block or support under the jack to elevate it.

In carrying out the invention, the axle 7 and wheel 8 along with the chassis corner will be lifted simultaneously by manipulating of a snubbing ordinary jack in association with an apparatus which is a permanent installation on the vehicle, there being four installations of the apparatus, one at each corner of the car, front and rear, although but one apparatus is illustrated in the drawings.

Figures 1 and 2 illustrate that a bracket member 9 has the gripping portions 10, 10a which are adapted to be secured to the bumper 2a at a point preferably just outwardly of the adjacent side frame or chassis member 2. The clamp members 10, 10a may be an annulus in each instance, and may be seated in grooves in the exterior wall of the substantially tubular bracket body 9—these grooves being illustrated as at 9a in Figure 4. The clamp members 10, 10a are held in place by clamp-bolts 9b. It should here be distinctly understood that the bracket member 9 may be of any shape, and the clamp elements 10, 10a may be integral or otherwise secured to the bracket member 9 within the contemplation of the present invention.

As illustrated, the bracket member 9 provides a tubular vertically extending bore 9c, into which projects the rear or heel portion of the forwardly extending guide element 11 which is provided by the thickened lower part of the wall of the bracket member 9. This guide member 11 provides the arcuate guide groove 11a which is open at the back and lower part of the guide member 11. The upper end of the guide groove 11a opens into the bore 9c of the bracket member at approximately the axis thereof, while the outer end of the guide groove 11 is directed forwardly of the car toward the axle 7.

Within the guide groove 11a is the preferably metal cable 12x having its rear end suitably secured to the shank portion 14 of the eye member 14a which is pivoted on pin 13, carried in the side wall portion 12a of the closure, or cap member 12, which is adapted to seat upon and close the upper end of the bore 9c of the bracket member 9, as clearly illustrated in Figure 4.

The depending side portion 12a of the cap member 12 is curved so as to fit the contour of the bore 9c and its lower end serves the purpose of an abutment for engagement by the actuator 21, to which reference will presently be made in detail.

The cable section 12x is secured by an appropriate cable clamp 15 or otherwise to a companion cable section 12', as illustrated in Figures 1 and 2—the cable section 12' passing under the axle 7 and through the pulley 16 which is carried by the coil-spring 17 whose rear end is secured to the chassis frame or to some other convenient fixed portion of the car.

The upper end of the cable section 12' is secured in the laterally turned terminal portion 18a of the bolt-like member 18 which is extended through a hole in the chassis frame member 2 and clamped in place by means of the nut 19,—between which and the adjacent side of the channel member 2 there is preferably disposed a spring washer 20.

The terminal portion 18a, at least, of the member 18 will be of mild steel, and the end of the cable 12' is secured therein by processing,—the soft mild steel being squeezed onto the cable under enormous pressure in a well known manner.

As will be apparent from an inspection of Figure 1, the spring 17 with its pulley 16 serves to take up the slack in the cable 12x, 12' and maintains the cap or closure member 12 in seated position in the upper end of the bore 9c of the bracket member 9. Thus the bracket member 9 has a finished appearance and snow or rain will be excluded from the bore 9. Also the spring 17 prevents looseness or shaking of the cable 12x, 12'. The cable itself engages the axle housing as a snubbing means and will be concealed by the wheel and fenders, or at least substantially so, so as not to be noticeable except on close inspection.

Numeral 21 designates what may be, and preferably is, a substantially sleeve-like member having, at an appropriate point approximately midway between its ends, the circumferential shoulder or abutment 22. Above the abutment 22, sleeve member 21 has the longitudinal slot 23 which will be of a width sufficient to receive the guide member or portion 11 of the bracket 9, so as to admit of the upper portion of the sleeve member 21 being inserted into the bore 9c of the bracket member 9 to engage the lower end of the side portion 12a of the closure member 12, to which, as previously described, the cable 12x, 12' is connected.

Figure 2 illustrates the application of the sleeve member to the bore 9c of the bracket member 9 so as to elevate the closure 12, 12a and take up the slack in the cable 12x, 12' against the yielding resistance of the pulley-carrying coil spring 17.

The circumferential shoulder 22 of the sleeve member 21 is an important feature, it being observed this shoulder is adapted to engage the lower portion of the bracket member 9 about the bore 9c so as to enable the lifting force of the jack 25 to be applied directly to the chassis frame of the car,—the jack 25 acting through the sleeve member 21 and bracket member 9 which is rigidly secured to the bumper 2a, which, in turn, is, of course, rigid with the chassis frame 2, etc.

The sleeve member 21 preferably has, adjacent its upper end, a hole or seat 24 which is adapted to receive the pin 24a after the sleeve 21 has been inserted in the bore 9c of bracket 9 and elevated to the position shown in Figure 2 for the purpose of taking up the slack in the cable 12x, 12' and bringing about engagement of the shoulder 22 with the lower end of the bracket 9. This pin 24a obviously holds the sleeve 22 in the position illustrated in Figure 2 against the action of the coil spring 17 so as to leave free both hands of the operator for adjusting of the jack under the enlarged lower end 21a of the sleeve member 21.

From the foregoing description taken in connection with the accompanying drawings, it will be evident that with the parts in the position shown in Figure 2, manipulation of the jack 25 will move the chassis corner, wheel and axle upwardly as a unit. The cable, as illustrated in Figure 2, simply supports the weight of the wheel and axle end, causing it to move up with the rear corner of the chassis without sagging, as would be the case otherwise, with the objections to which reference has previously been made herein.

With the construction of Figures 1 and 2, as above described, it will be apparent that the cable 12x, 12' will never move while it is under load,—it being plain that the cable will only move when the sleeve 21 is being inserted by hand and actuated to the position in Figure 2; and, of course, conversely, when the spring 17 is again withdrawing the cable after the sleeve 21 has been removed, to restore the closure member 12, 12a to the position shown in Figure 1. Of course, the shoulder 22 on the sleeve member 21 will be located at the proper place so that it will engage the lower end of the bracket member 9 when the cable 12x, 12' has been drawn tight.

Thus, the utilization of the structure illustrated in Figures 1 and 2 and especially the shouldered sleeve 21, 22 assures against movement of the cable 12, 12' under load, making unnecessary the use of a pulley at the site of guide 11, 11a and at the point of contact of the cable with the axle 7. Also the structure of Figures 1 and 2 eliminates any necessity of providing a heavy cable 12x, 12' for sustaining the load of the car corner and the weight of such passengers as may be in the car at the time it is jacked up.

The invention also includes the use of sleeves 21 without shoulder 22. In such instances the jacking force is applied directly to the movable element 12, first to take up slack in the cable 12x, and then to elevate the chassis and axle, the lift being by the cable and its engagement with guide element 11 which provides a cleat.

Figures 7, 8, 9, and 10 illustrate an alternative construction wherein the cable 30 is looped up about the axle 7' as indicated at 30a,—a suitable cable clamp 31 being secured to the cable for binding the end of the loop to the main strand above the axle. The cable passes through the pulley 32 carried by the spring 33 which is secured to the chassis frame 34,—the spring 33 and pulley 32 serving the same function as the spring 17 and the pulley 16 of Figures 1 and 2.

Suitably secured on the inner side of the chassis frame member 34 is the arcuate cable guide member 35 which supports the cable and directs it rearwardly and downwardly to the guide portion 36' of the bracket member 36 which is secured to the bumper 2a as shown in Figure 7.

The cable 30 extends upwardly from the guide portion 36' of the bracket member 36 and into the bore 36a of the bracket portion. The upper end of the cable 30 terminates in eye 30b pivoted to cap member 37 of the bracket member 36 as in Figures 1 and 2.

A sleeve 39 is adapted to be inserted into the bore 36a of the bracket member 36 to engage the depending closure wall portion 37a and elevate the closure 37 to take up cable slack, the same as already described in connection with elements 21, 12, 12a, 12x, 12' of Figures 1 and 2, preparatory to the application of a jack. The bracket 36 provides the slotted or seating portion 36c adapted to be slipped under the bumper 2a adjacent the rear end of a chassis frame member 24 to establish a lifting connection between the bracket member and chassis corner. A clamp bolt 41 may be employed for maintaining the bracket 36 in the position on the bumper.

The sleeve member 39 will preferably have the shoulder 39b for engaging the lower end of the bracket 36 as illustrated in Figure 10,—and, of course, the sleeve 39 will be slotted as at 39c so as to clear the portion of the cable 30 which extends into the bore 36a of the guide bracket 36.

Figure 8:
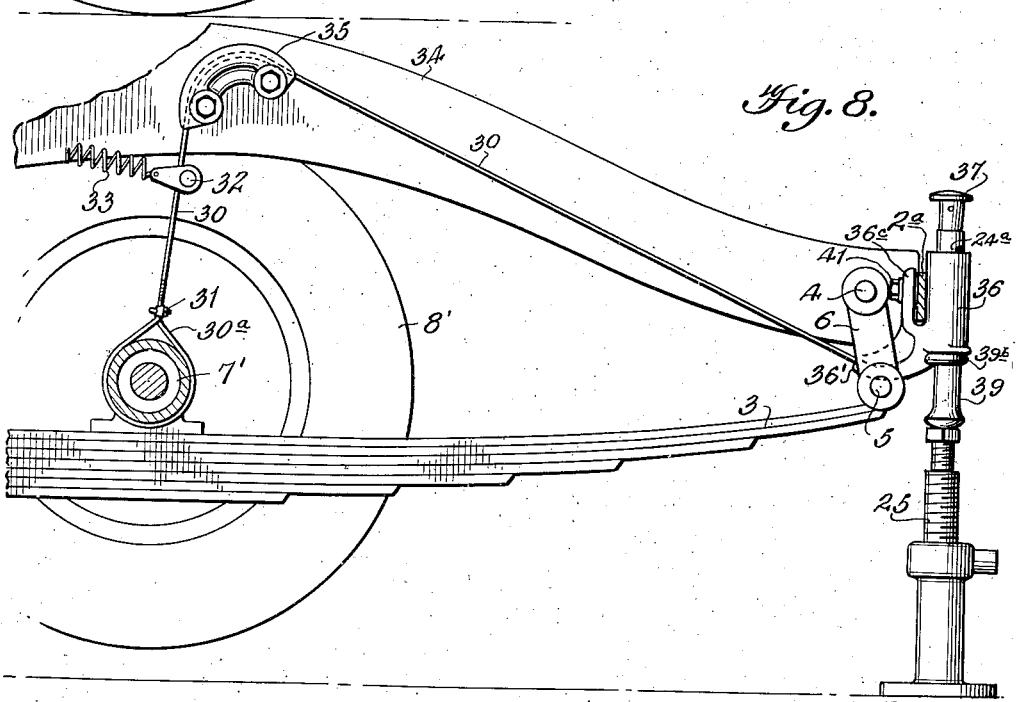

The major difference between the structures of Figures 1 and 2 and that of Figures 7 and 8 lies in the fact that the end of the cable is secured to the axle instead of to the chassis frame.

Under some circumstances it may be desirable to use anti-friction cable guides in lieu of 9, or 36, or 35, especially when the jack-operated sleeve 21, or 39, is without a shoulder such as 22 (Fig. 2). Without a shoulder, such as 22, establishing direct lifting engagement with the chassis through bracket 9 or 36, there would probably be slight movement of the cable under load and possibly making the use of pulleys desirable.

In lieu of the chassis-side-carried guide 35 of Figures 7 and 8, I may use the pulley bracket 50 of Figure 12, having guide pulley 51 for cable 30. Also I may employ a pulley-incorporating bracket 60 (Fig. 11) in lieu of members 9 or 36 at the rear of the chassis. Here the pulley 61 extends into the bore of bracket 60 and will be straddled by the slot 23, 39c of the sleeve members 21, 39 respectively, the same as they straddle the fixed inwardly extending portions of cable guides 11, 36' of Figures 1 and 7.

In service the cable engages the axle housing to limit its movement away from the chassis under action of the spring, thus, providing efficient chassis snubber means including an anchor element, such as the closure 12, that is movable to elevate the chassis and axle upon engagement by portable jacking means.

Having thus described my invention, what I claim is:

1. In a jacking apparatus for axle supported vehicles or the like, a bracket having a chassis engaging portion, means for securing such portion to the chassis, said bracket having a vertically extending passageway open at each end, a closure member for one end of said passageway having a marginal flange engageable with the top of said bracket, chassis and axle connecting means in said passageway and secured to said closure member, and a jack element slidably receivable in and controlled by said passageway to engage said closure.

2. A jacking attachment for automobiles and the like for preventing relative separating movement of juxtaposed chassis and axle portions when the chassis is jacked up, and comprising a member having a guide passageway, means for detachably securing said member to the chassis frame, a closure element for one end of said passageway, and having a portion working therein, a projection at the opposite end of said member from said closure element and providing a guideway, said projection extending into said passageway, a flexible connection working in the passageway and in the guideway of said projection, one end of said flexible connection being secured to said closure, means for preventing separating movement of said closure element from said passageway including said flexible connection secured to one of said juxtaposed chassis and axle portions and operatively engageable with the other, means normally holding said separating-movement-preventing means in inoperative position and acting through said flexible connection for holding said closure element seated, and jack-operated means insertable in said passageway to engage said closure element and to actuate the same to dispose said separating-movement-preventing means in operative position.

3. A jacking attachment for automobiles and the like for preventing relative separating movement of juxtaposed chassis and axle portions when the chassis is jacked up, and comprising a guide member having a passageway, means for detachably securing said guide member to the chassis frame, a closure element for one end of said passageway, a projection at the opposite end of said member from said closure element and providing a guideway, a flexible connection working in the passageway and in the guideway of said projection, one end of said flexible connection being secured to said closure element, means for preventing separating movement of said closure element from said member including said flexible connection secured to one of said juxtaposed chassis and axle portions and operatively engageable with the other, means normally holding said separating-movement-preventing means in inoperative position and acting through said flexible connection for holding said closure element seated, and jack-operated means insertable in said passageway to engage said closure element and actuate the same to dispose said separating-movement-preventing means in operative position.

4. A jacking attachment for automobiles and the like for preventing relative separating movement of juxtaposed chassis and axle portions when the chassis is jacked up, and comprising a member having a passageway, means for detachably securing said member to the chassis frame, a closure element for one end of said passageway, a projection at the opposite end of said member from said closure and providing a guideway, said projection extending into said passage, a flexible connection working in the passageway and in the guideway of said projection, one end of said flexible connection being secured to said closure element, means for preventing separating movement of said closure element from said member including said flexible connection secured to one of said juxtaposed chassis and axle portions and operatively engageable with the other, and jack-operated means insertable in said passageway to engage said closure element and actuate the same to dispose said separating-movement-preventing means in operative position.

5. A jacking attachment for automobiles and the like for preventing relative separating movement of juxtaposed chassis and axle portions when the chassis is jacked up, and comprising a member having a passageway, means for detachably securing said member to the chassis frame, a closure element for one end of said passageway, a projection at the opposite end of said member from said closure element and providing a guideway, said projection extending into said passageway, a flexible connection working in the passageway and in the guideway of said projection, one end of said flexible connection being secured to said closure element, means for preventing separating movement of said closure element from said member including said flexible connection secured to one of said juxtaposed chassis and axle portions and operatively engageable with the other, and jack-operated means insertable in said guide passageway to engage said closure element and actuate the same to dispose said separating-movement-preventing means in operative position, said jack-operated means having a lineal portion slidingly receiving the rear part of said projection whereby to cooperate with said passageway of said member in guiding said jack-operated means.

6. A jacking attachment for automobiles and the like for preventing relative separating movement of juxtaposed chassis and axle portions when the chassis is jacked up, and comprising a member having a passageway, means for detachably securing said member to the chassis frame, a closure element for one end of said passageway, a projection at the opposite end of said member from said closure element and providing a guideway, a flexible connection working in the passageway and in the guideway of said projection, one end of said flexible connection being secured to said closure element, means for preventing separating movement of said closure element from said member, including said flexible connection secured to one of said juxtaposed chassis and axle portions and operatively engageable with the other, and jack operated means insertable in said passageway to engage said closure element and actuate the same to dispose said separating-movement-preventing means in operative position, said jack-operated means having a shoulder adapted to engage the member about its passageway after the separating-movement-preventing means has been actuated to an operative position whereby to effect simultaneous elevation of the chassis and axle portions.

7. In a vehicle carried jacking accessory for vehicles having a spring connected axle and chassis, means for assuring simultaneous lifting of the spring-connected axle with the chassis, comprising a movable member, a chassis carried seat therefor, a normally slack cable carried by said member and operatively engaged with the chassis and axle, yieldable slack take-up means for said cable whereby to permit of the normal flexing of the chassis and axle-connecting springs when the vehicle is in transit, said yieldable slack take-up means acting through said cable to maintain said movable member against its seat, and a jack engageable implement adapted to be initially engaged with said movable element and moved by hand to unseat the same and take up said cable slack whereby when the jack is applied the cable will not travel under load, said implement having means which positively engages the seat when the cable is taut and other means for locking said implement in the manually operated position to permit application of the jack.

8. In a vehicle carried jacking accessory for vehicles having a spring connected axle and chassis, means for assuring simultaneous lifting of the spring-connected axle with the chassis, comprising a movable member, a chassis carried seat therefor, a normally slack cable carried by said member and operatively engaged with the chassis and axle, yieldable slack take-up means for said cable whereby to permit of the normal flexing of the chassis and axle-connecting springs when the vehicle is in transit, said yieldable slack take-up means acting through said cable to maintain said movable member against its seat, and a jack engageable implement adapted to be initially engaged with said movable element and moved by hand to unseat the same and take up said cable slack whereby when the jack is applied the cable will not travel under load, said implement having a shoulder adapted to positively engage said chassis when the cable slack is taken up.

9. In a chassis axle lifting appliance for preventing flexing of a chassis and axle connecting spring when jacking, a slack cable connection between the axle and chassis, and a hand operable element engageable with said cable connection for taking up its slack preparatory to jacking said element having a stop which positively engages the chassis when said slack is taken up whereby to prevent travel of the cable relatively of the axle and chassis under load conditions, and means for locking the hand operable element in slack take-up position.

10. In a chassis axle lifting appliance for preventing flexing of a chassis and axle connecting spring when jacking, a slack connection between the axle and chassis, a hand operable element engageable with said connection for taking up its slack preparatory to jacking whereby to prevent travel of the cable relatively of the axle and chassis under load conditions, and said hand operable element having a portion adapted to positively engage the chassis when said connection slack has been taken up, said element being adapted to be engaged and operated by a jack.

11. In a chassis-carried axle lifting appliance, a normally slack cable operatively associated with the axle and chassis, jack engageable means having an initially acting cable slack take-up portion, and a subsequently acting chassis engaging portion whereby to relieve the cable of the load of the chassis when the same is lifted, and means adapted to lock said means in the slack take-up position and chassis engaging position.

12. A jacking device for a vehicle including a chassis, an axle, and a spring connecting the axle and chassis; a portable jack mechanism; snubber means including a movable element, means insertable in the snubber means for actuating said movable element to maintain a fixed relationship of said axle and chassis in a jacking operation, and said actuating means having a shoulder adapted positively to engage the snubber means and also a bearing portion for operative engagement by the portable jack mechanism.

13. In a jacking device for a vehicle in which the body carrying frame is supported on the axles by springs, a portable jack; a bracket attached to the vehicle frame; flexible, but non-stretchable means, normally slack, but adapted to be drawn taut to tie the axle to the frame, said means extending into the bracket; a plug normally seated in the bracket and having one end of the flexible means attached thereto; and a member insertable into the bracket to engage the plug, and having a shoulder, said member being manually operable to move the plug for rendering the slack, flexible means taut and at the same time cause engagement of the shoulder with the bracket, preparatory to the placement of the jack in engagement with said member for frame lifting purposes.

SWINFEN BRAMLEY-MOORE.